US012725746B2

(12) United States Patent
Cheng et al.

(10) Patent No.: US 12,725,746 B2
(45) Date of Patent: Sep. 1, 2026

(54) VACUUM INTERRUPTER WITH VACUUM DEVICE SHIELD

(71) Applicant: S&C Electric Company, Chicago, IL (US)

(72) Inventors: Kam Wa Cheng, Stafford (GB); Leslie Thomas Falkingham, Rugby (GB); Jason R. Bogusz, Chicago, IL (US)

(73) Assignee: S&C Electric Company, Chicago, IL (US)

( * ) Notice: Subject to any disclaimer, the term of this patent is extended or adjusted under 35 U.S.C. 154(b) by 339 days.

(21) Appl. No.: 18/438,735

(22) Filed: Feb. 12, 2024

(65) Prior Publication Data

US 2024/0331959 A1 Oct. 3, 2024

Related U.S. Application Data

(60) Provisional application No. 63/456,106, filed on Mar. 31, 2023.

(51) Int. Cl.
*H01H 33/662* (2006.01)

(52) U.S. Cl.
CPC ................. *H01H 33/66261* (2013.01); *H01H 2033/66276* (2013.01)

(58) Field of Classification Search
CPC ... H01H 33/66261; H01H 2033/66269; H01H 2033/66276; H01H 2033/66284; H01H 2033/66292
USPC ............ 218/136, 135, 137, 118, 10; 29/622; 361/616
See application file for complete search history.

(56) References Cited

U.S. PATENT DOCUMENTS

| | | | | | |
|---|---|---|---|---|---|
| 5,399,973 | A * | 3/1995 | Kitamura | G01R 31/3275 | 324/424 |
| 5,597,992 | A * | 1/1997 | Walker | H01H 33/6606 | 218/138 |
| 8,039,771 | B2 * | 10/2011 | Trondsen | H01H 33/66261 | 218/136 |
| 9,455,104 | B1 * | 9/2016 | Leusenkamp | H01H 33/66261 | |
| 10,134,546 | B2 * | 11/2018 | Li | H01H 33/6606 | |
| 10,854,403 | B2 * | 12/2020 | Takai | H01H 33/66207 | |

* cited by examiner

*Primary Examiner* — William A Bolton

(57) ABSTRACT

A vacuum interrupter including a nominally cylindrical insulator having a first insulator portion and a second insulator portion defining a gap therebetween and a nominally cylindrical vapor shield having a first ring of a plurality of spaced apart bobbles and a second ring of a plurality of spaced apart bobbles. A gap ring including a series of spaced apart cut-out notches facing the vapor shield is positioned within the gap. The plurality of bobbles in the first and second ring of bobbles are configured so that the bobbles in the second ring pass through the cut-out notches in the gap ring and the bobbles in the first ring rest on the gap ring.

19 Claims, 3 Drawing Sheets

VACUUM INTERRUPTER WITH VACUUM DEVICE SHIELD

CROSS-REFERENCE TO RELATED APPLICATION

This application claims the benefit of priority from the U.S. Provisional Application No. 63/453,106, filed on Mar. 31, 2023, the disclosure of which is hereby expressly incorporated herein by reference for all purposes.

BACKGROUND

Field

This disclosure relates generally to a vacuum interrupter including a vapor shield.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders including three single-phase feeders that carry the same current but are 120° apart in phase. three-phase and single-phase lateral lines are tapped off of the feeder that provide the medium voltage to various distribution transformers, where the voltage is stepped down to a low voltage and is provided to loads, such as homes, businesses, etc.

Power distribution networks of the type referred to above typically include switching devices, breakers, reclosers, interrupters, etc. that control the flow of power throughout the network. A vacuum interrupter is a switch that has particular application for many of these types of devices, because they are designed to withstand the relatively high power. A vacuum interrupter employs opposing contacts, one fixed and one movable, positioned within a vacuum enclosure. When the vacuum interrupter is opened by moving the movable contact away from the fixed contact to prevent current flow through the interrupter a plasma arc is created between the contacts that is quickly extinguished in the vacuum at the next zero current crossing, where metal vapor is emitted from the contacts. The separated contacts in vacuum provide dielectric strength that exceeds power system voltage and prevents current flow. The vacuum interrupter housing supports the contact structures and is an insulator, typically ceramic, to provide dielectric strength.

After vacuum interrupter opening cycles the metal vapor emitted by the arcing creates a conductive metal coating on an inside surface of the insulation housing, and thus provides a conduction path around the contacts, which prevents the vacuum interrupter from operating properly. Therefore, in many vacuum interrupter designs, an annular vapor shield is provided between the contacts and the insulation housing at a central location, i.e., does not extend the entire length of the insulation housing, where the top and bottom ends of the shield may be turned towards the contacts to cause the metal vapor to collect on the shield and not on the inside of the insulation housing.

SUMMARY

The following discussion discloses and describes a vacuum interrupter including a nominally cylindrical insulator having a first insulator portion and a second insulator portion defining a gap therebetween and a nominally cylindrical vapor shield having a first ring of a plurality of spaced apart bobbles and a second ring of a plurality of spaced apart bobbles. A gap ring including a series of spaced apart cut-out notches facing the vapor shield is positioned within the gap. The plurality of bobbles in the first and second rings of bobbles are configured so that the bobbles in the second ring pass through the cut-out notches in the gap ring and the bobbles in the first ring rest on the gap ring.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a vacuum interrupter including split insulator portions, a single piece vapor shield and a ring having cut-out notches positioned between the insulator portions, where bobbles in a lower shield portion pass through the cut-out notches and bobbles in an upper shield portion rest on the ring is merely exemplary in nature, and is in no way intended to limit the disclosure or its applications or uses.

Figure 1:
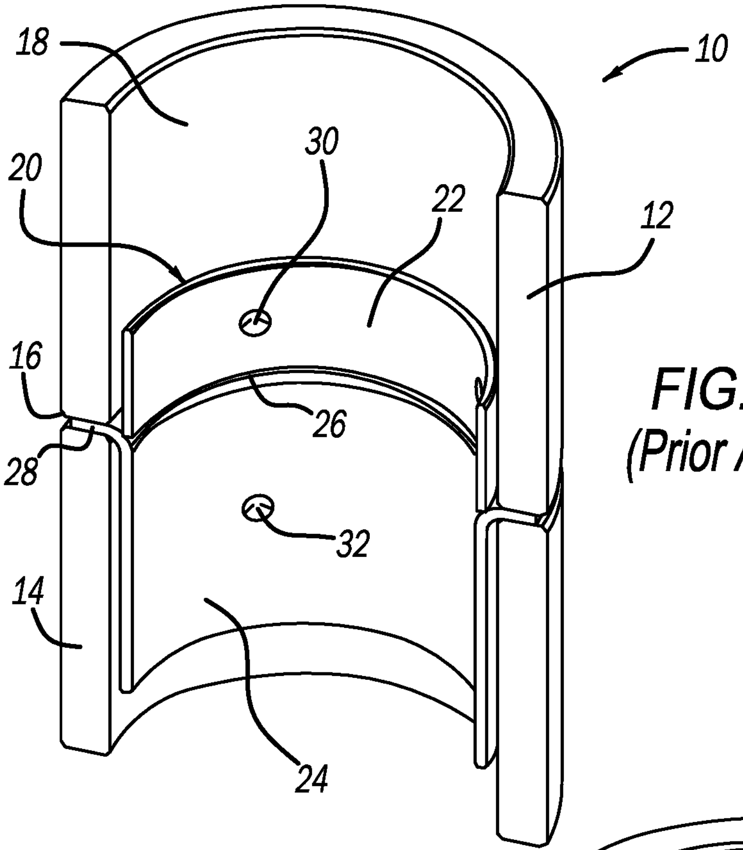
FIG. 1 (Prior Art)
FIG. 1 is a cut-away isometric view of a portion of a vacuum interrupter showing a known vapor shield.

FIG. 1 is a cut-away isometric view of a portion of a vacuum interrupter 10 including an upper nominally cylindrical ceramic insulator 12 and a lower nominally cylindrical ceramic insulator 14 defining a gap 16 therebetween, where a vacuum chamber 18 is provided within the insulators 12 and 14 and where fixed and movable contacts (not shown) would be provided within the chamber 18. These and other parts of the vacuum interrupter 10 are not shown for clarity purposes, but their location and operation would be well understood by those skilled in the art. The vacuum interrupter 10 also includes a cylindrical vapor shield 20 positioned within the chamber 18 and against an inside surface of the insulators 12 and 14, which operates to collect metal vapor that is emitted when the contacts separate and the vacuum interrupter 10 is opened, thus preventing a metal coating from forming on the insulators 12 and 14, which could create a conductive path around the separated contacts. In this known design, the vapor shield 20 includes an upper cylindrical portion 22 and a lower cylindrical portion 24 that are brazed or welded together along a seam 26, where the lower portion 24 includes a flange ring 28 positioned within the gap 16. The vapor shield 20 can be made of any suitable material, such as copper, steel, etc. The upper portion 22 includes a bobble 30 that seats within an indentation (not shown) in the upper insulator 12 to provide axial positioning of the upper portion 22 relative to a center axis of the vacuum interrupter 10 and the insulator 12, and the lower portion 24 includes a bobble 32 that seats within an indentation (not shown) in the lower insulator 14 to provide axial positioning of the lower portion 24 relative to the center axis of the vacuum interrupter 10 and the insulator 14. As used herein, a bobble is a feature formed on the shield that has a greater pitch circle diameter (PCD) than the body of the shield and acts to locate the shield radially relative to the upper and lower portions 22 and 24.

Figure 2:
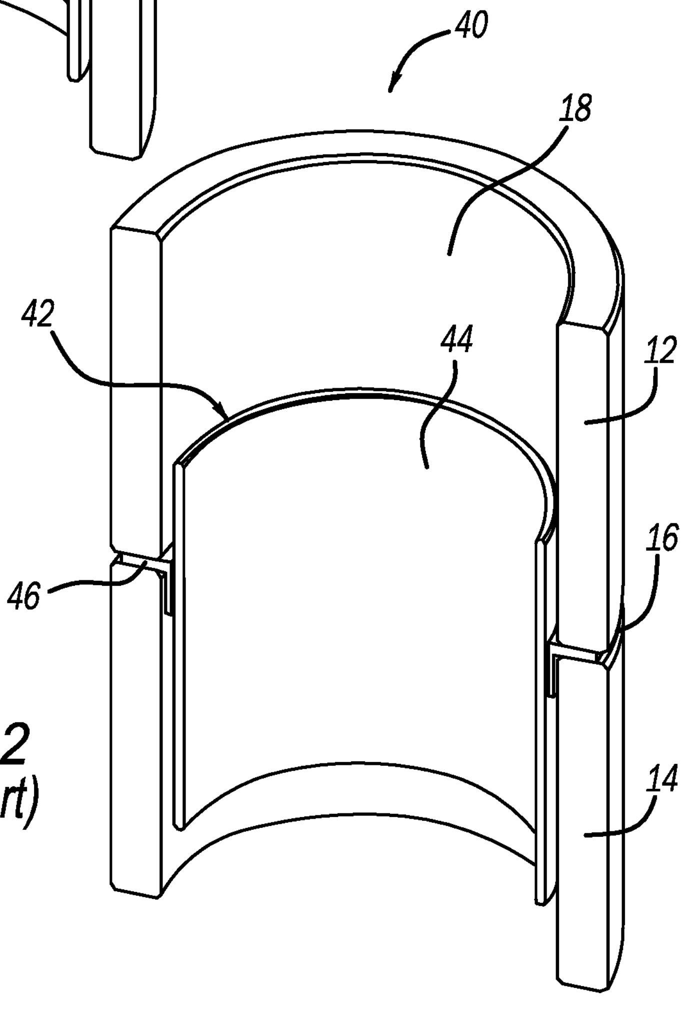
FIG. 2 (Prior Art)
FIG. 2 is a cut-away isometric view of a portion of a vacuum interrupter showing another known vapor shield.

FIG. 2 is a cut-away isometric view of a portion of a vacuum interrupter 40, where like elements to the vacuum interrupter 10 have the same reference number. In this known design, the vapor shield 20 is replaced with a vapor shield 42 that includes a single piece cylindrical tube 44 formed to an inside surface of the upper and lower insulators 12 and 14. An L-shaped annular ring 46 is brazed or welded to the tube 44 and is positioned within the gap 16. The shield 42 is axially positioned relative to the insulators during assembly using external jigging (not shown).

Improvements in the design of the vapor shields can be made so that the shield can be a single piece and not require external jigging for axial alignment of the vapor shield.

Figure 3:
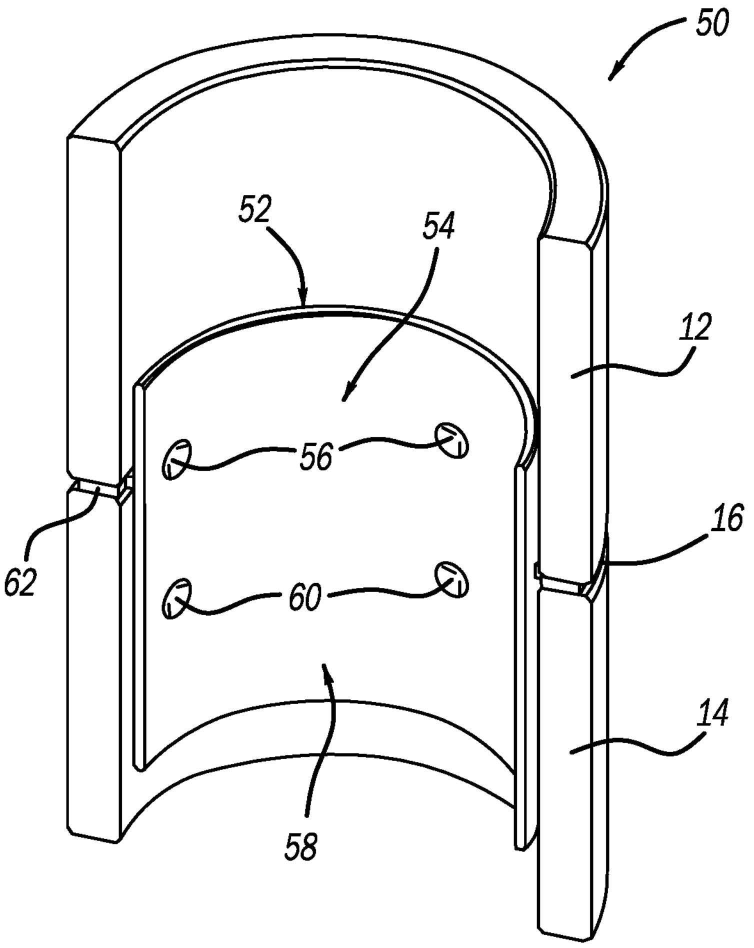
FIG. 3 is a cut-away isometric view of a portion of a vacuum interrupter showing a vapor shield including a ring with cut-out notches and upper and lower aligned bobbles.
Figure 4:
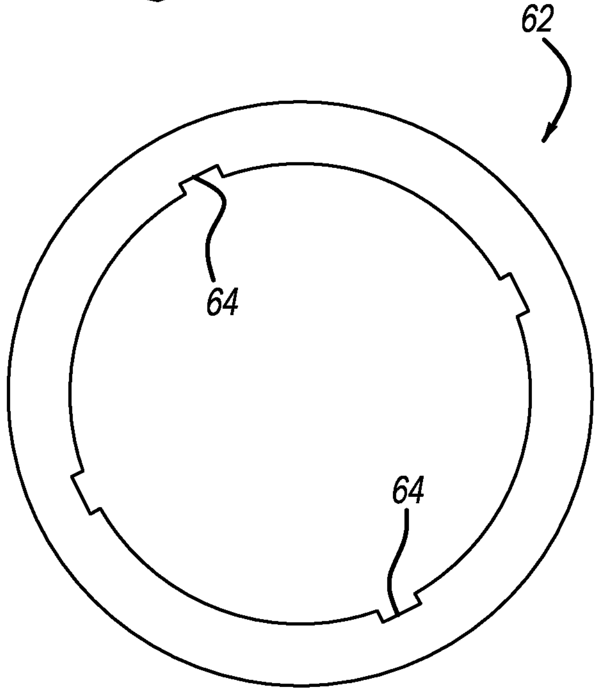
FIG. 4 is a top view of the ring with the cut-out notches separated from the vacuum interrupter shown in FIG. 3.

FIG. 3 is a cut-away isometric view of a portion of a vacuum interrupter 50, where like elements to the vacuum interrupter 10 have the same reference number. In this design, the vapor shield 20 is replaced with a vapor shield 52 that includes an upper ring 54 of spaced apart bobbles 56 and a lower ring 58 of spaced apart bobbles 60, where each bobble 56 in the upper ring 54 is axially aligned with a bobble 60 in the lower ring 58. The vacuum interrupter 50 also includes a ring 62 positioned within the gap 16 and having spaced apart cut-out notches 64 facing the vapor shield 52. FIG. 4 is a top view of the ring 62 separated from the vacuum interrupter 50. The spacing between and the number of the cut-out notches 64 matches the spacing between and the number of the bobbles 56 in the upper ring 54 and the spacing between and the number of the bobbles 60 in the lower ring 58. During assembly of the vacuum interrupter 50, the ring 62 is positioned and secured within the gap 16, and the vapor shield 52 is slid into the chamber 18 so that the bobbles 56 and 60 are aligned with the cut-out notches 64. After the lower ring 58 of the bobbles 60 passes through the cut-out notches 64, but before the upper ring 54 of the bobbles 56 passes through the cut-out notches 64, the vapor shield 52 is rotated a certain amount so that the bobbles 56 and 60 axially align with indentations (not shown) in the upper and lower cylindrical insulators 12 and 14. The shield 52 is inserted further into the chamber 18 until the bobbles 56 contact and sit on a portion of the ring 62 that does not have the cut-out notches 64 and the bobbles 56 and 60 are seated within the indentations. The vapor shield 52 is then brazed or welded to the ring 62.

The terminology upper ring and lower ring are used herein as the bobbles 56 in the ring 54 and the bobbles 60 in the ring 58 are positioned on an axial plane. However, in certain embodiments, the bobbles 60 in the lower or second ring may be axially offset from each other and not all be in the same axial plane. The intent is that in those embodiment, the bobbles 60 are still defined as a ring of bobbles. Further, in this non-limiting embodiment there are four equally spaced cut-out notches 64 and bobbles 56 and 60, where the vapor shield 52 can be rotated 45°. However, other numbers of cut-outs and bobbles may be suitable, such as any number between 3 and 10 cut-outs and bobbles.

Figure 5:
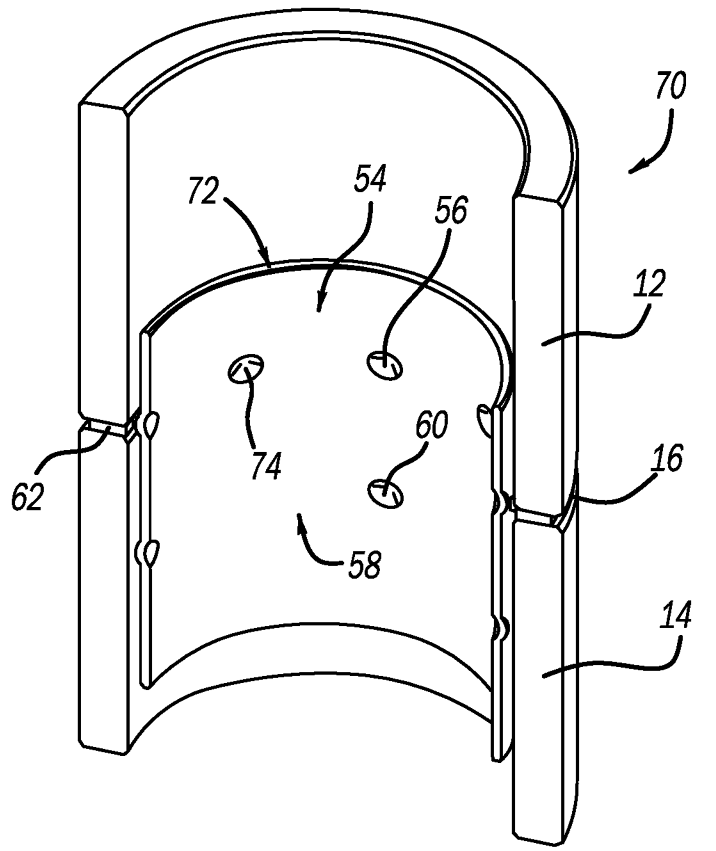
FIG. 5 is a cut-away isometric view of a portion of a vacuum interrupter showing a vapor shield including the ring with the cut-out notches and more upper bobbles than lower bobbles.

FIG. 5 is a cut-away isometric view of a portion of a vacuum interrupter 70, where like elements to the vacuum interrupter 50 have the same reference number. In this design, the vapor shield 50 is replaced with a vapor shield 72 that includes the upper ring 54 of the spaced apart bobbles 56 and the lower ring 58 of the spaced apart bobbles 60, but where there are more or additional bobbles 74 in the upper ring 54 than the bobbles 60 in the lower ring 58 and the cut-out notches 64. In other words, the vapor shield 72 still includes the axially aligned bobbles 56 and 60, but there is not a counterpart bobble in the lower ring 58 or cut-out notch 64 to the additional bobbles 74. Thus, the shield 72 does not need to be rotated after the lower ring 58 of the bobbles 60 pass through the cut-out notches 64 because the additional bobbles 74 will rest on the ring 62. Appropriate indentations (not shown) are provided at the proper locations in the insulators 12 and 14 so that the bobbles 56, 60 and 74 are positioned therein.

Figure 6:
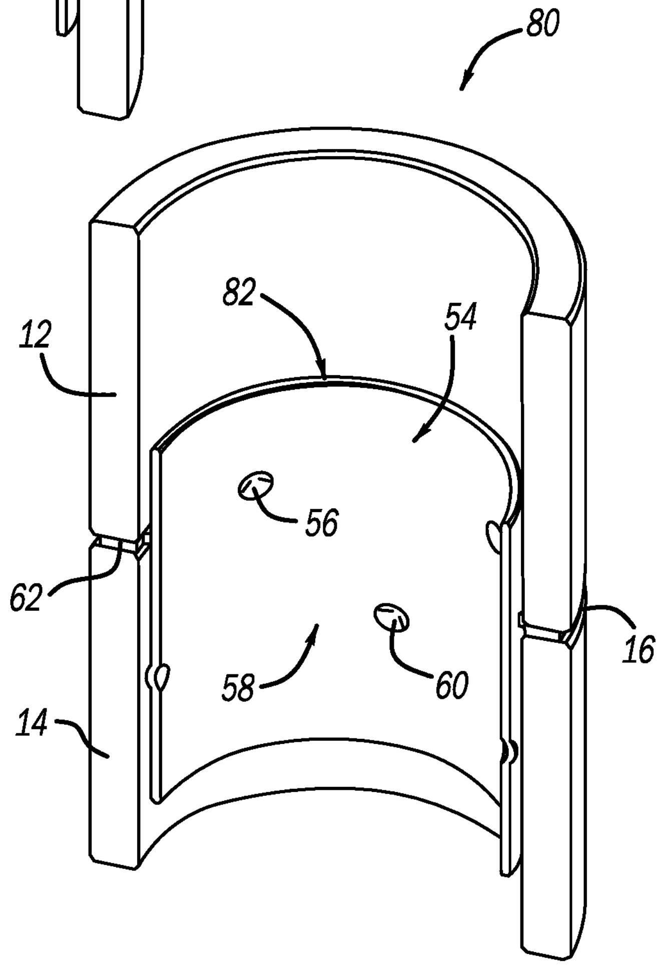
FIG. 6 is a cut-away isometric view of a portion of a vacuum interrupter including a vapor shield having the ring with the cut-out notches and radially offset upper and lower bobbles.

FIG. 6 is a cut-away isometric view of a portion of a vacuum interrupter 80, where like elements to the vacuum interrupter 50 have the same reference number. In this design, the vapor shield 50 is replaced with a vapor shield 82 that includes the upper ring 54 of the spaced apart bobbles 56 and the lower ring 58 of the spaced apart bobbles 60, but where the bobbles 56 and 60 are not axially aligned with each other, which is defined herein as being radially offset. Therefore, the shield 82 does not need to be rotated after the lower ring 58 of the bobbles 60 pass through the cut-out notches 64 because the bobbles 56 will rest on the ring 62. Appropriate indentations (not shown) are provided at the proper locations in the insulators 12 and 14 so that the bobbles 56 and 60 are positioned therein.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A vacuum interrupter comprising:

a cylindrical insulator including a first insulator portion and a second insulator portion defining a gap therebetween;

a cylindrical vapor shield including a first ring of a plurality of spaced apart bobbles and a second ring of a plurality of spaced apart bobbles; and a gap ring positioned within the gap and including a series of spaced apart cut-out notches facing the vapor shield, wherein, the spaced apart cut-out notches are configured and oriented such that during axial insertion of the vapor shield within the cylindrical insulator the bobbles in the second ring pass through the cut-out notches in the gap ring so as to engage an inner surface of the second insulator portion and the bobbles in the first ring rest on the gap ring.

2. The vacuum interrupter according to claim 1 wherein each bobble in the first ring of bobbles is axially aligned with a bobble in the second ring of bobbles, and wherein following axial insertion of the vapor shield into the insulator the vapor shield is the vapor shield is configured to be rotated such that the bobbles in the first ring rest on the gap ring.

3. The vacuum interrupter according to claim 1 wherein each bobble in the second ring of bobbles is axially aligned with a bobble in the first ring of bobbles, and wherein the first ring of bobbles includes more bobbles than the second ring of bobbles.

4. The vacuum interrupter according to claim 1 wherein each bobble in the first and second rings of bobbles are radially offset from each other.

5. The vacuum interrupter according to claim 1 wherein the bobbles in the second ring of bobbles are all positioned on an axial plane.

6. The vacuum interrupter according to claim 1 wherein the gap ring is brazed or welded to the vapor shield.

7. The vacuum interrupter according to claim 1 wherein a number of cut-out notches corresponds to a number of bobbles in the second ring, and wherein the number of cut-out notches and the number of bobbles is between 3 and 10.

8. The vacuum interrupter according to claim 7 wherein the number of cut-out notches and bobbles in the second ring is 4.

9. The vacuum interrupter according to claim 1 wherein the vapor shield is a single piece vapor shield.

10. A vacuum interrupter comprising:

a cylindrical insulator including a first insulator portion and a second insulator portion defining a gap therebetween;

a cylindrical vapor shield including a first ring of a plurality of spaced apart bobbles and a second ring of a plurality of spaced apart bobbles, wherein each bobble in the first and second rings of bobbles are radially offset from each other; and a gap ring positioned within the gap and including a series of spaced apart cut-out notches facing the vapor shield, wherein the plurality of bobbles in the second ring correspond in number to a number of cut-out notches in the gap ring.

11. The vacuum interrupter according to claim 10 wherein each bobble in the first ring of bobbles is positioned within an indentation in the first insulator portion and each bobble in the second ring of bobbles is positioned within an indentation in the second insulator portion.

12. The vacuum interrupter according to claim 10 wherein the gap ring is brazed or welded to the vapor shield.

13. The vacuum interrupter according to claim 10 wherein the number of cut-out notches and bobbles in the second ring is between 3 and 10.

14. The vacuum interrupter according to claim 13 wherein the number of cut-out notches and bobbles in the second ring is 4.

15. The vacuum interrupter according to claim 10 wherein the vapor shield is a single piece vapor shield.

16. A vacuum interrupter comprising:

a cylindrical insulator including a first insulator portion and a second insulator portion defining a gap therebetween;

a single piece cylindrical vapor shield including a first ring of a plurality of spaced apart bobbles and a second ring of a plurality of spaced apart bobbles; and a gap ring positioned within the gap and including a series of spaced apart cut-out notches facing the vapor shield, wherein each bobble in the first ring of bobbles is positioned within an indentation in the first insulator portion and each bobble in the second ring of bobbles is positioned within an indentation in the second insulator portion.

17. The vacuum interrupter according to claim 16 wherein each bobble in the first ring of bobbles is axially aligned with a bobble in the second ring of bobbles, and wherein the vapor shield is assembled by inserting the vapor shield into the insulator so that the second ring of bobbles pass through the cut-out notches in the gap ring and the vapor shield is rotated before the bobbles in the first ring pass through the cut-out notches in the gap ring.

18. The vacuum interrupter according to claim 16 wherein each bobble in the second ring of bobbles is axially aligned with a bobble in the first ring of bobbles, and wherein the first ring of bobbles includes more bobbles than the second ring of bobbles.

19. The vacuum interrupter according to claim 16 wherein each bobble in the first and second rings of bobbles are radially offset from each other.

* * * * *